(12) United States Patent
Sastry et al.

(10) Patent No.: US 7,565,522 B2
(45) Date of Patent: Jul. 21, 2009

(54) METHODS AND APPARATUS FOR INTEGRITY MEASUREMENT OF VIRTUAL MACHINE MONITOR AND OPERATING SYSTEM VIA SECURE LAUNCH

(75) Inventors: Manoj R. Sastry, Portland, OR (US); Burzin A. Daruwala, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 671 days.

(21) Appl. No.: 10/842,670

(22) Filed: May 10, 2004

(65) Prior Publication Data

US 2005/0251867 A1 Nov. 10, 2005

(51) Int. Cl.
*G06F 9/00* (2006.01)
(52) U.S. Cl. .............................................. 713/2; 726/34
(58) Field of Classification Search ........................ 713/2
See application file for complete search history.

(56) References Cited

OTHER PUBLICATIONS

Tal Garfinkel, Ben Pfaff, Jim Chow, Mendel Rosenblum, Dan Boneh, Terra: a virtual machine-based platform for trusted computing, Proceedings of the nineteenth ACM symposium on Operating systems principles, Oct. 19-22, 2003, Bolton Landing, NY, USA, pp. 193-206.*

International Business Machines Corp., *Logical Partition Security in the IBM eserver pSeries 690*, i-9 (Feb. 15, 2000).

McIsaac, Kevin, *Intel Server Consolidation: Part 1—Virtualization*, TechUpdate.com, 1-3 (Apr. 7, 2003) available at http://www.techupdate.com/techupdate/stories/main/0,14179,2913255,00.html.

Jeremy Sugerman et al., Virtualizing I/O Devices on VMware Workstation's Hosted Virtual Machine Monitor, *Proceedings of the 2001 USENIX Annual Technical Conference*, (Jun. 25-30, 2001), available at http://www.usenix.org/publications/library/proceedings/usenix01/sugerman.html.

* cited by examiner

*Primary Examiner*—Kimyen Vu
*Assistant Examiner*—Yogesh Paliwal
(74) *Attorney, Agent, or Firm*—Hanley, Flight & Zimmerman, LLC

(57) ABSTRACT

Methods and apparatus to measure the integrity of a virtual machine monitor and an operating system via secure launch are disclosed. In one example, a method measures a first characteristic of a virtual machine monitor, stores the first measured characteristic in a first hardware protected location, measures a second characteristic of an operating system with the virtual machine monitor, wherein the measuring of the second characteristic is initiated by the operating system, and stores the second measured characteristic in a second hardware protected location.

22 Claims, 10 Drawing Sheets

METHODS AND APPARATUS FOR INTEGRITY MEASUREMENT OF VIRTUAL MACHINE MONITOR AND OPERATING SYSTEM VIA SECURE LAUNCH

TECHNICAL FIELD

The present disclosure is directed generally to computer system security and, more particularly, to methods and apparatus to measure the integrity of a virtual machine monitor (VMM) and an operating system (OS) via secure launch.

BACKGROUND

The past few years have shown a growing trend of computer system dependence among businesses. Computer systems have become such an essential tool for businesses that billions of dollars in revenue have been lost in recent computer outages (i.e., virus attacks, hacker attacks, etc.). Some of the most damaging computer outages have been attributed to intentional virus attacks or erroneous software glitches. In either case, intentional or unintentional malignant software can be quite damaging to computer systems and the businesses that depend on them.

Many developments have been made in the area of computer system security and/or protection policies in an effort to protect against malignant software and to create more robust and dependable computing environments. Some examples of computer system protection policies include hardware protection, resource monitors, and authentication procedures.

Currently, integrity verification of software and/or firmware running on a computer system does not include measuring all software in the system. Instead, the integrity of the computer system is verified by measuring a portion of the software and/or firmware running on the computer system. However, the unmeasured portion (e.g., the software and/or firmware that carries out the measurement) of the computer system is left unverified. This unmeasured portion is a breach in security that is open for exploitation by a hacker and/or a computer virus. Thus currently-available computer systems are typically only partially protected from outside and/or inside intrusions.

DETAILED DESCRIPTION

The following describes example methods, apparatus, and articles of manufacture that provide a networked computer system having the ability to measure the integrity of a virtual machine monitor and an operating system executing on a networked computer system via secure launch. While the following disclosure describes systems implemented using software or firmware executed by hardware, those having ordinary skill in the art will readily recognize that the disclosed systems could be implemented exclusively in hardware through the use of one or more custom circuits, such as, for example, application-specific integrated circuits (ASICs) or any other suitable combination of hardware, firmware, and/or software.

In general, the methods and apparatus disclosed herein may be used to measure the integrity of a virtual machine monitor and an operating system executing on a remote networked computer system to facilitate networked communication. More specifically, a chain of trust is established in a first computer system by trusted computer hardware that measures the integrity of a virtual machine monitor, followed by the virtual machine monitor measuring the integrity of an operating system. The measurement of the virtual machine monitor and the operating system may then be transmitted via the network to a separate, second computer system. The second computer system has methods for identifying a trustworthy virtual machine monitor and a trustworthy operating system to thereby determine the system integrity of the first computer system.

Figure 1:
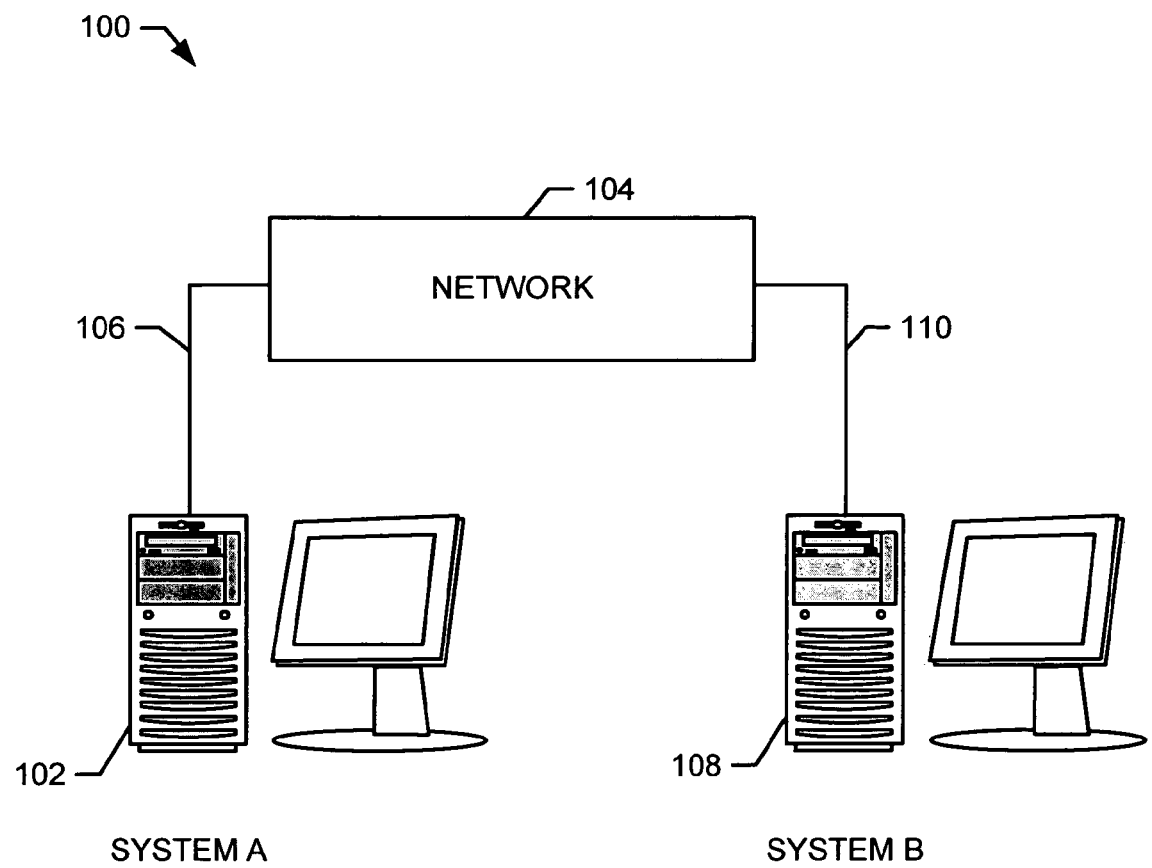
FIG. 1 is a block diagram of an example network system wherein a first computer is configured to test the integrity of a remote computer system via the network.

FIG. 1 is a block diagram of an example network system 100. The network system 100 includes a computer system A 102 operatively coupled to a network 104 via a first connection 106 and a computer system B 108 that is operatively coupled to the network 104 via a second connection 110. Computer system A 102 is configured to receive and test the integrity of computer system B 108.

The computer systems 102, 108 may be servers, personal computers (PCs), personal digital assistants (PDAs), Internet appliances, cellular telephones, or any other suitable computing device. The computer system A 102 exchanges data with other devices (e.g., the computer system B 108) via the first connection 106 to the network 104. The first connection 106 and the second connection 110 may be any type of network connection, such as an Ethernet connection, a digital subscriber line (DSL), a telephone line, a coaxial cable, etc. The network 104 may be any type of network, such as the Internet, a telephone network, a cable network, and/or a wireless network.

Figure 2:
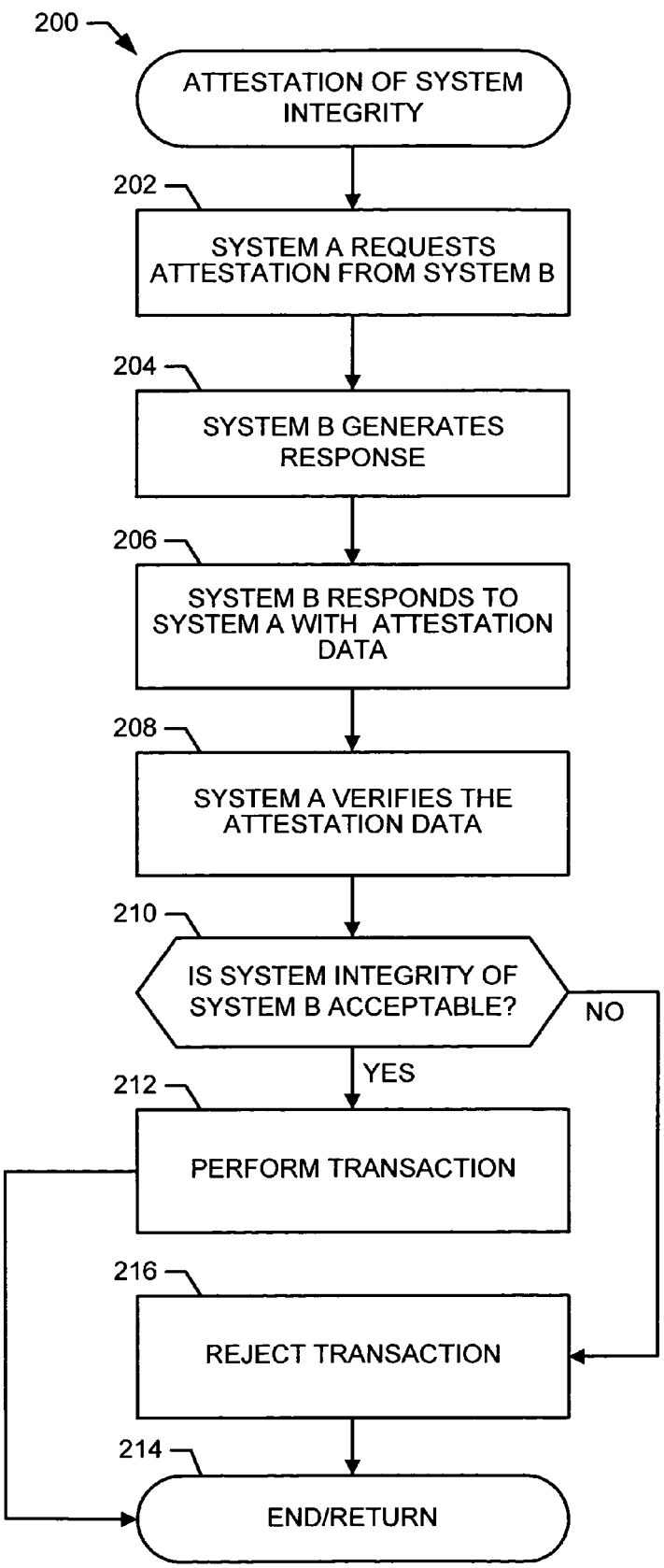
FIG. 2 is a flowchart representative of example machine accessible instructions, which may be executed by the computer of FIG. 1 to test the integrity of the remote computer system.

In the example of FIG. 1, the computer systems 102, 108 of FIG. 1 are configured to perform machine executable instructions (i.e., an attestation of system integrity process 200 such as shown in FIG. 2) that test the integrity of the computer system B 108 of FIG. 1. The attestation of system integrity process 200 begins when the computer system A 102 requests verification from the computer system B 108 via the network 104 (block 202). For example, the computer system A 102 may generate a random value (i.e., a nonce or challenge), insert the random value into a request message, and transmit the request message to the computer system B 108 via a protocol (e.g., transmission control protocol (TCP), user datagram protocol (UDP), or any other suitable communication protocol). The request for verification may occur at any time, but typically occurs as a prelude to performing a transaction between the computer systems 102, 108 (e.g., in response to a user request to obtain data (e.g., a web page) from the computer system B 108).

The request message is received by the computer system B 108 and is used to generate a response message (block 204). For example, the computer system B 108 may generate measurement data that is associated with verifying the integrity of the computer system B 108 and may insert the measurement data into the response message. Additionally, the computer system B 108 may insert data associated with the random value received from computer system A 102 into the response message. The measurement data, random value data, and/or any other suitable data may be included in the response message as attestation data.

After it is constructed, the response message is transmitted from the computer system B 108 to the computer system A 102 via the network 104 (block 206). The response message may be transmitted over the network 104 via any known protocol (e.g., transmission control protocol, user datagram protocol, or any other suitable communication protocol).

In response to receipt of the response message, the computer system A 102 extracts the attestation data from the response message and verifies the attestation data (block 208). For example, the attestation data may be checked against one or more expected values that are stored on the computer system A 102 to determine if the attestation data and, thus, if the computer system B 108 itself is acceptable to computer system A 102 (block 210). If the system integrity of computer system B 108 is acceptable to the computer system A 102 (block 210), the computer system A 102 performs one or more transactions with the computer system B 108 (block 212) and the attestation of system integrity process 200 ends and/or returns control to any calling routine(s) (block 214). The transaction(s) performed at block 212 may be any transaction sent over the network 104. For example, the transaction may be a bank transaction that should only be transacted with a trusted computer system.

On the other hand, if the system integrity of computer system B 108 is not acceptable to computer system A 102 (block 210), the computer system A 102 rejects any further transaction(s) with the computer system B 108 (block 216) and the attestation of system integrity process 200 ends and/or returns control to any calling routine(s) (block 214). Additionally, the computer system B 108 may perform the attestation of system integrity process 200 on computer system A 102 to verify the integrity of computer system A 102.

Figure 3:
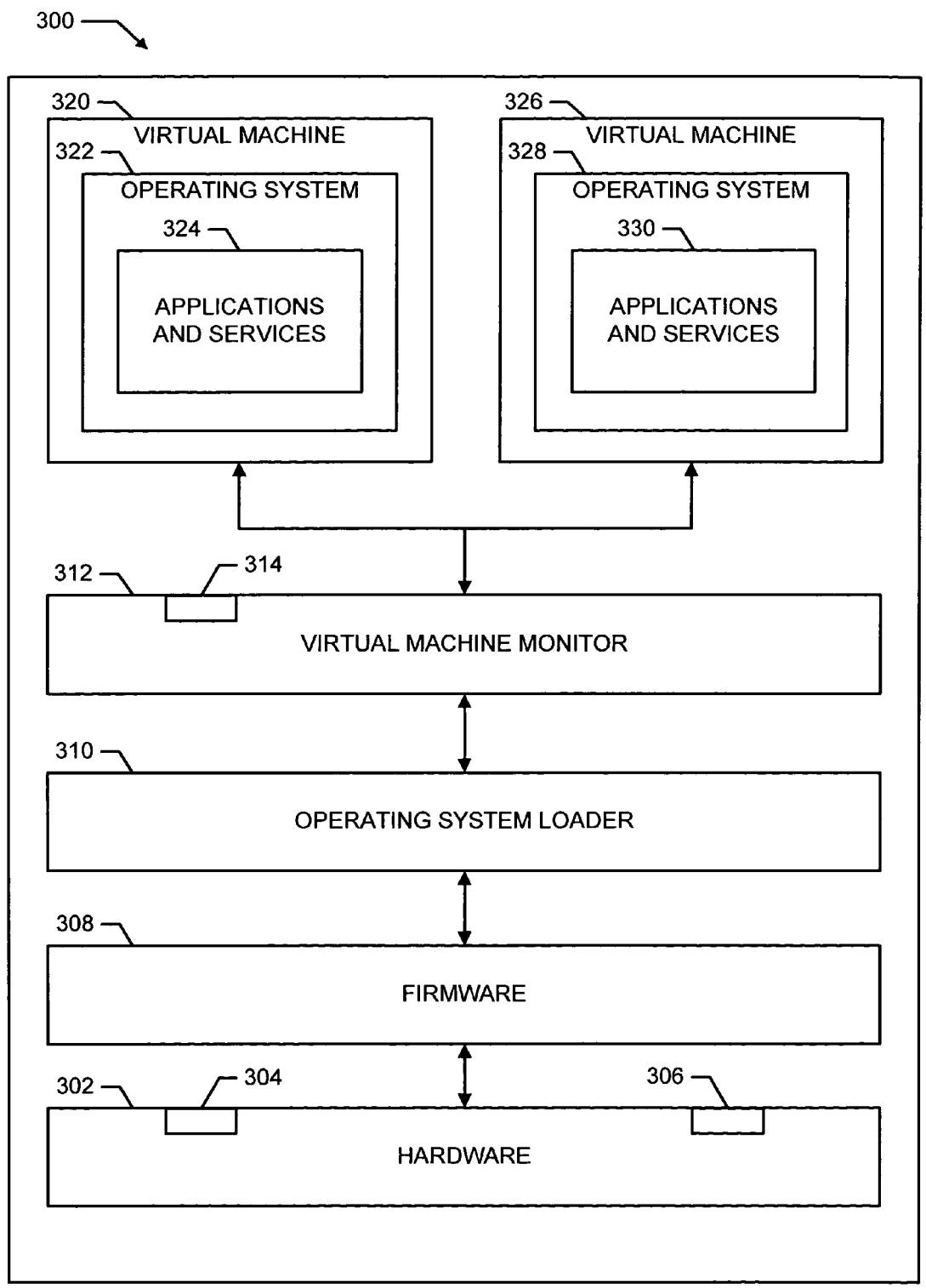
FIG. 3 is a block diagram of an example computer system that may be configured to measure the integrity of a virtual machine monitor and an operating system.

FIG. 3 is a block diagram of an example computer system 300 configured for integrity measurement of a virtual machine monitor and an operating system. FIG. 3 may illustrate either or both of the computer systems 102, 108 of FIG. 1. The computer system 300 includes hardware 302 having a first hardware protected location 304 and a second hardware protected location 306, firmware 308, an operating system loader 310, a virtual machine monitor 312 having a measurement agent 314, a virtual machine (VM) 320 having an operating system 322 including applications and services 324, and a virtual machine 326 having an operating system 328 including applications and services 330.

Figure 10:
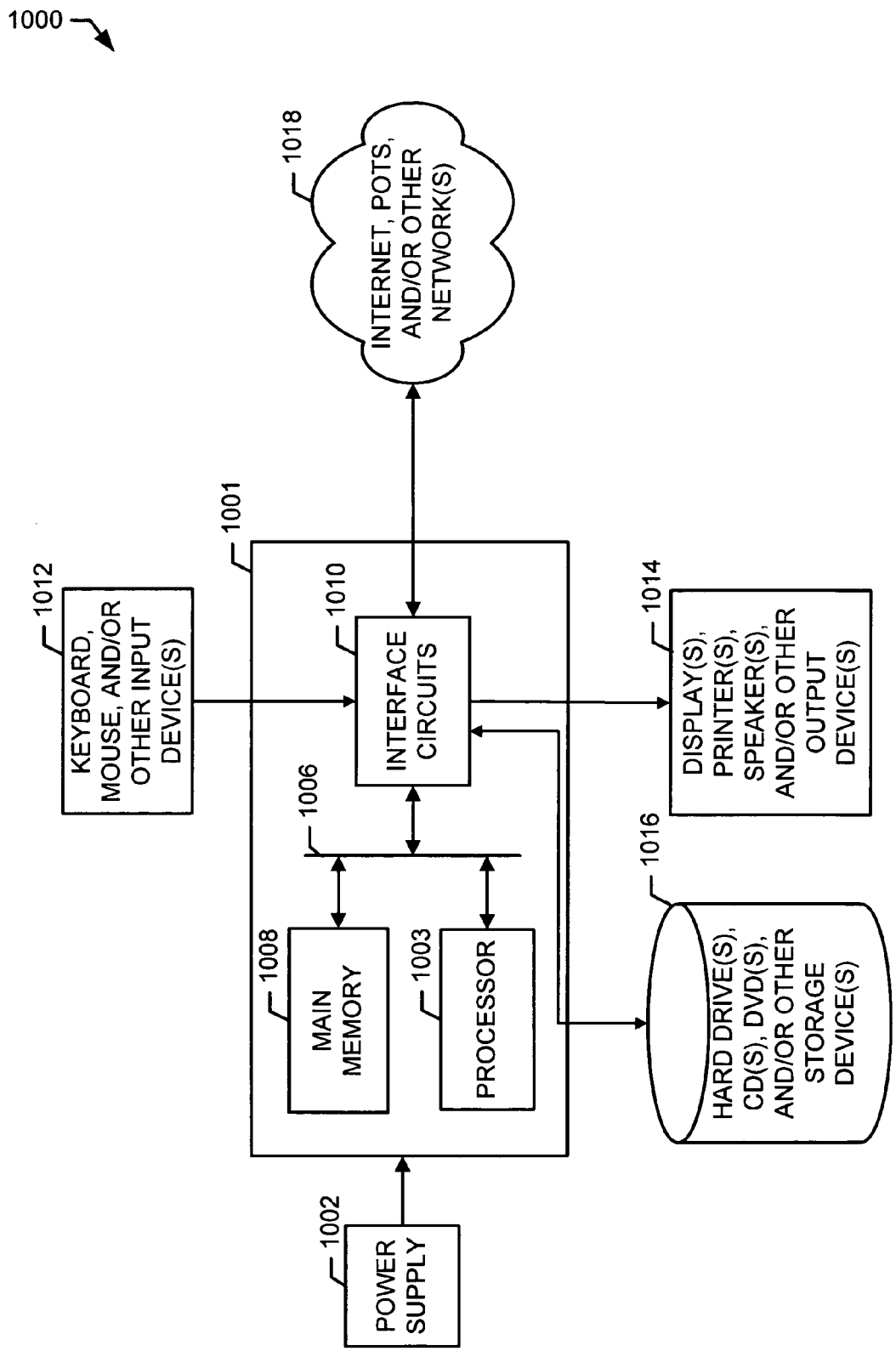
FIG. 10 is a schematic illustration of an example computer system, which may be used to implement either of the computers of FIG. 1.

Persons of ordinary skill in the art will readily recognize that the hardware 302 may include any physical aspect of the computer system 300 such as a processor (e.g., the processor 1003 of FIG. 10), a network interface (e.g., the interface circuits 1010 of FIG. 10), and a main memory device (e.g., the main memory device 1008 of FIG. 10). The hardware 302 also typically includes input device(s), output device(s), and/or mass storage device(s). An example implementation of the hardware 302 is described below in conjunction with FIG. 10.

The first hardware protected location 304 may be a protected execution memory location that is located in a main processing unit (e.g., the main processing unit 1001 of FIG. 10). For example, the first hardware protected location 304 may be used by the virtual machine monitor 312 to store attestation data associated with the integrity of the virtual machine monitor 312 in a protected, tamper free location.

The second hardware protected location 306 may be a protected execution memory location that is located in a main processing unit (e.g., the main processing unit 1001 of FIG. 10). For example, the second hardware protected location 306 may be used by the virtual machine monitor 312 to store attestation data associated with the integrity of an operating system (e.g., the operating system 322 and/or the operating system 328) in a protected, tamper free location. While only two hardware protected locations (i.e., the first hardware protected location 304 and the second hardware protected location 306) are illustrated in FIG. 3, the hardware 302 may include any number of hardware protected locations and is therefore not limited to two hardware protected locations.

The firmware 308 may be implemented as machine accessible instructions to boot up (i.e., start up) the computer system 300 in a conventional manner. The firmware 308 manages data flow between the operating system loader 310 and the hardware 302 of the computer system 300 in order to run pre-boot applications and to boot an operating system (e.g., the operating system 322 and/or the operating system 328). The firmware 308 may be part of or include, for example, the basic input/output system (BIOS) of the computer system 300.

The operating system loader 310 enables the computer system 300 to load an operating system (e.g., the operating system 322 and/or the operating system 328). For example, the operating system may be a Microsoft Windows® operating system, UNIX® operating system, Linux® operating system, etc., each of which may need to be loaded in a different manner. The operating system loader 310 may be implemented using one or more of many well-known operating system loaders, such as the grand unified bootloader (GRUB)™ operating system loader from the GNU's® not UNIX® (GNU)® project. After the operating system loader 310 completely starts the operating system, the operating system loader 310 may terminate and the operating system subsequently communicates with the firmware 308 and the hardware 302 either directly or indirectly through the virtual machine monitor 312.

The virtual machine monitor 312 may be a firmware or a software component that is configured to enable and support a series of virtual environments or virtual machines (e.g., the virtual machine 320 and the virtual machine 326). The virtual machine monitor 312 ensures that the operation of each of the plurality of virtual machines does not interrupt the operation of any other virtual machine. In particular, the virtual machine monitor 312 takes control of the computer system 300 when one of the plurality of virtual machines attempts to perform an operation that may affect the other virtual machines.

Each virtual machine in the plurality of virtual machines (e.g., the virtual machine 320 and the virtual machine 326) operates like a complete physical machine that can run an instance of an operating system. Different virtual machines may run different and/or the same type of operating system. For example, a first virtual machine may include an operating system such as the Microsoft® Windows® eXPerience (XP)® operating system, a second virtual machine may include an operating system such as the Microsoft® Windows® new technology (NT)® operating system, and a third virtual machine may include an operating system such as the Linux® operating system. Alternatively, one or more of the plurality of virtual machines may be implemented as an execution environment. For example, the execution environment may be a Java Virtual Machine (JVM)®, a Microsoft® .NET™ common language runtime (CLR)™, a practical extraction and reporting language (PERL) virtual machine (e.g., Parrot), an application executing without the assistance of an operating system, etc.

A crash of an operating system in one of the plurality of virtual machines may not affect an operating system executing in a different virtual machine because the virtual machines have isolated resources. For example, the Microsoft® Windows® XP® operating system in the first virtual machine and the Linux® operating system in the third virtual machine may not be affected by a crash in the Microsoft® Windows® NT® operating system in the second virtual machine. The operating system 322 and/or the operating system 328 may be any of the above mentioned operating systems, such as a Microsoft® Windows® operating system, UNIX® operating system, Linux® operating system, etc.

The measurement agent 314 may be a firmware or a software component in the virtual machine monitor 312 that securely launches the virtual machine monitor 312 and enables an operating system to measure itself. The measurement agent 314 is discussed in further detail below in conjunction with FIG. 7.

The applications and services 324 may include any application or service running on the operating system 322. For example, the applications and services 324 may include programs such as Microsoft® Word™, International Business Machines (IBM®) Lotus Notes®, etc. that include instructions compiled, interpreted, or assembled from source code written in a computer programming language such as C/C++, Java, NET, practical extraction and reporting language (PERL), assembly language, or any other suitable programming language. Similarly, the applications and services 330 may include any applications or services running on the operating system 328.

Figure 4:
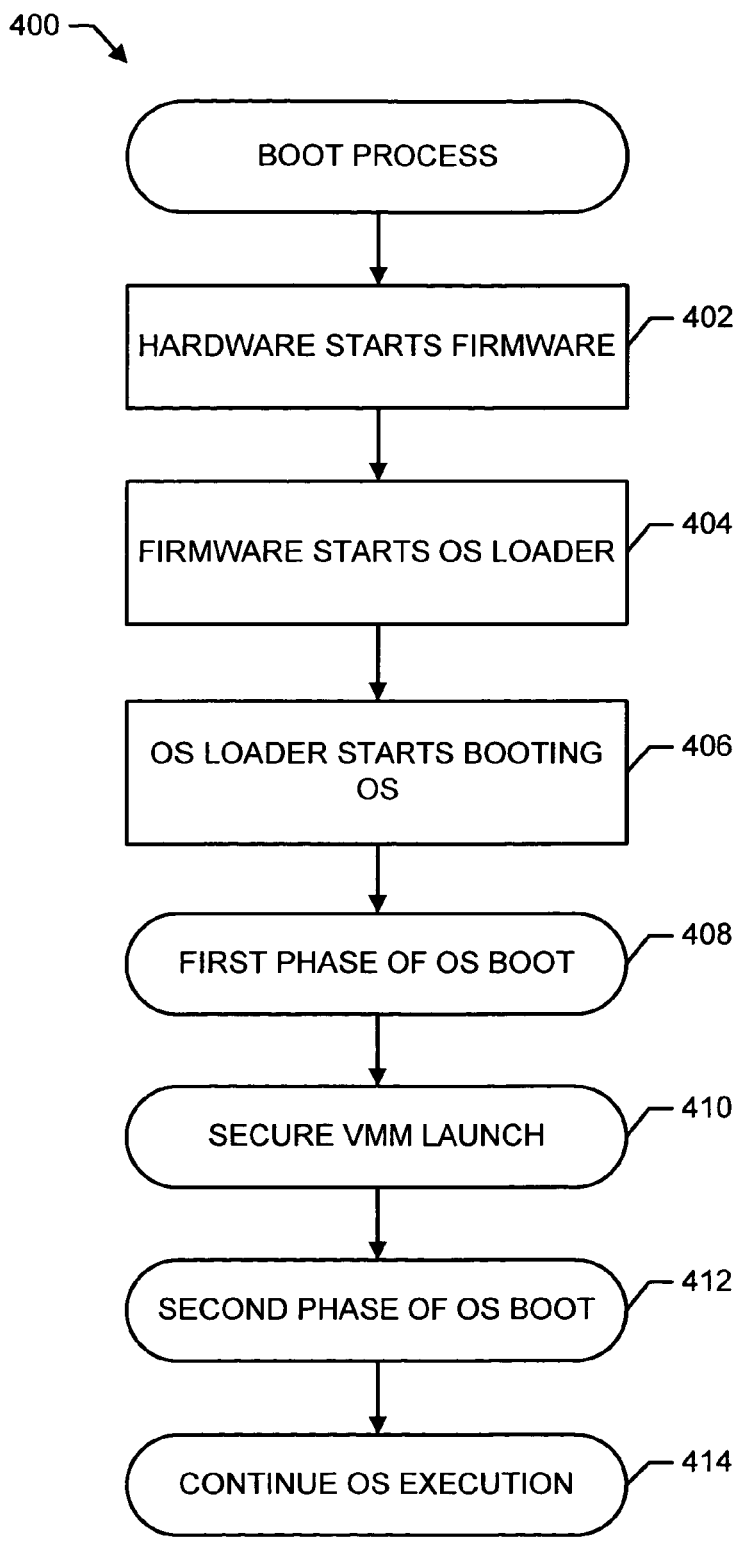
FIG. 4 is a flowchart representative of example machine accessible instructions which may be executed to boot the computer system shown in FIG. 3 according to an embodiment.

FIG. 4 illustrates an example process to boot a computer system (i.e., a boot process 400). The boot process 400 starts the execution of a computer system, such as the example computer system 300 of FIG. 3. In such an example, the hardware 302 begins execution of the boot process 400 (i.e., upon power up of the computer system 300) by executing one or more instructions in the firmware 308 (block 402).

The firmware 308 may have a boot manager that when initiated will attempt to load pre-boot drivers and applications (e.g., the operating system loader 310) (block 404). The operating system loader 310 starts the operating system 322 and then may terminate the execution of the operating system loader 310 (block 406). Additionally as is described in greater detail below in conjunction with block 410, the operating system 322 may be configured to start the virtual machine monitor 312.

After the operating system loader 310 starts booting the operating system 322 (block 406), the boot process 400 invokes a first phase of an operating system boot process (block 408). The first phase of the operating system boot process is an initial boot sequence of the operating system 322. An example first phase of the operating system boot process 500 is shown in FIG. 5.

Figure 5:
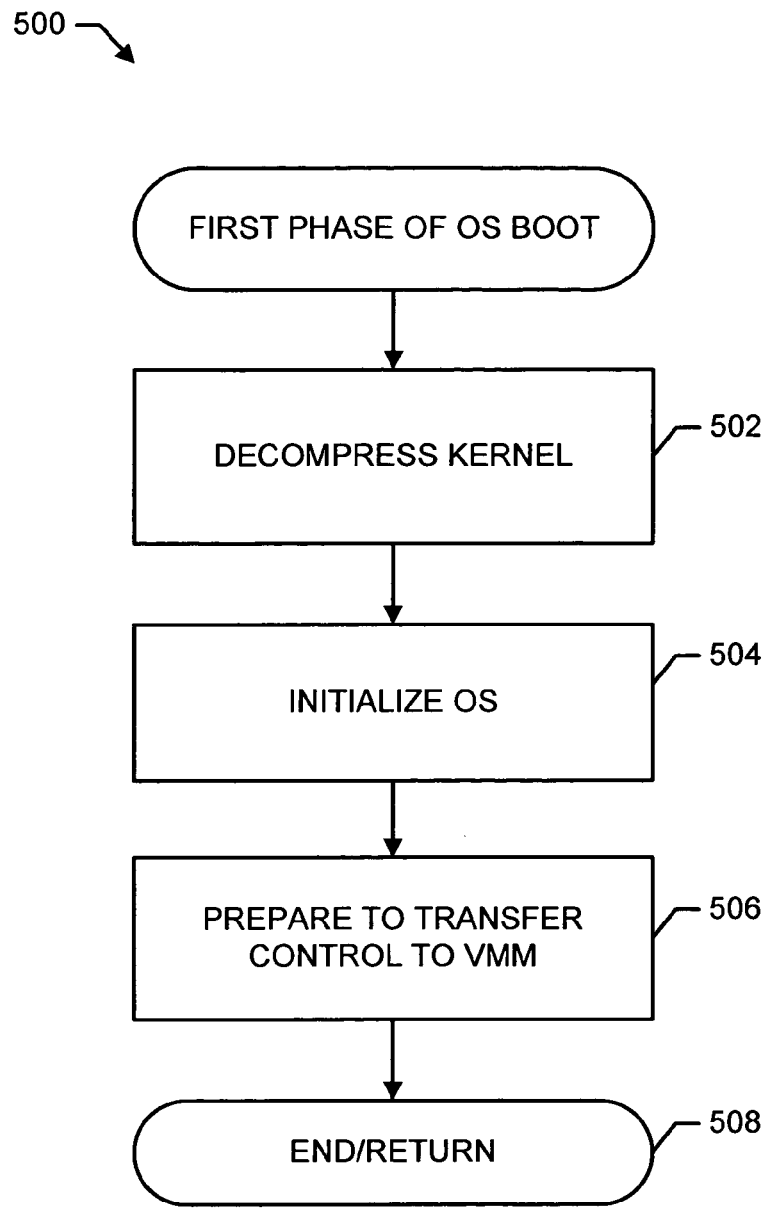
FIG. 5 is a flowchart representative of example machine accessible instructions which may be executed to boot a first phase of an operating system shown in FIG. 3 according to an example embodiment.

Turning to FIG. 5, the first phase of the operating system boot process 500 starts execution of an operating system (e.g., the operating system 322 of FIG. 3) of a computer system (e.g., the example computer system 300 of FIG. 3). The first phase of the operating system boot process 500 may be implemented as one or more instructions executed by the operating system 322. The operating system 322 begins execution of the first phase of the operating system boot process 500 by decompressing an operating system kernel (block 502). For example, the operating system kernel may be compressed for efficiency and may require decompression. Persons of ordinary skill in the art will readily recognize that many well-known compression and decompression techniques exist that may be used to implement block 502. While an operating system may exist that does not require decompressing of the operating system kernel, block 502 is shown for completeness and is not limiting to an operating system that requires decompression.

After decompressing the operating system kernel (block 502), the operating system 322 initializes the operating system 322 (block 504). The operating system 322 may initialize the operating system 322 by setting up an operating system kernel mode stack, initializing a plurality of provisional kernel page tables (e.g., the plurality of provisional kernel page tables may be located in a main memory device (e.g., the main memory device 1008 of FIG. 10) and may be used by the operating system 322 to store pages), and enabling paging of the pages in the provisional kernel page tables.

After initializing the operating system 322 (block 504), the operating system 322 prepares to transfer control to the virtual machine monitor 312 (block 506). In preparation to transfer control to the virtual machine monitor 312 (block 506), the operating system 322 may, for example, store the current execution state of the operating system 322. Alternatively, some operating systems may not require preparation prior to the transfer of control to the virtual machine monitor 312. After preparing to transfer control to the virtual machine monitor (block 506), the first phase of the operating system boot process 500 ends and/or returns control to any calling routine(s) (block 508).

Returning to FIG. 4, after the first phase of the operating system boot process returns control to the boot process 400 (block 408), the boot process 400 invokes a secure virtual machine monitor launch process (block 410). The secure virtual machine monitor launch process is a method that measures and starts the virtual machine monitor 312.

Figure 6:
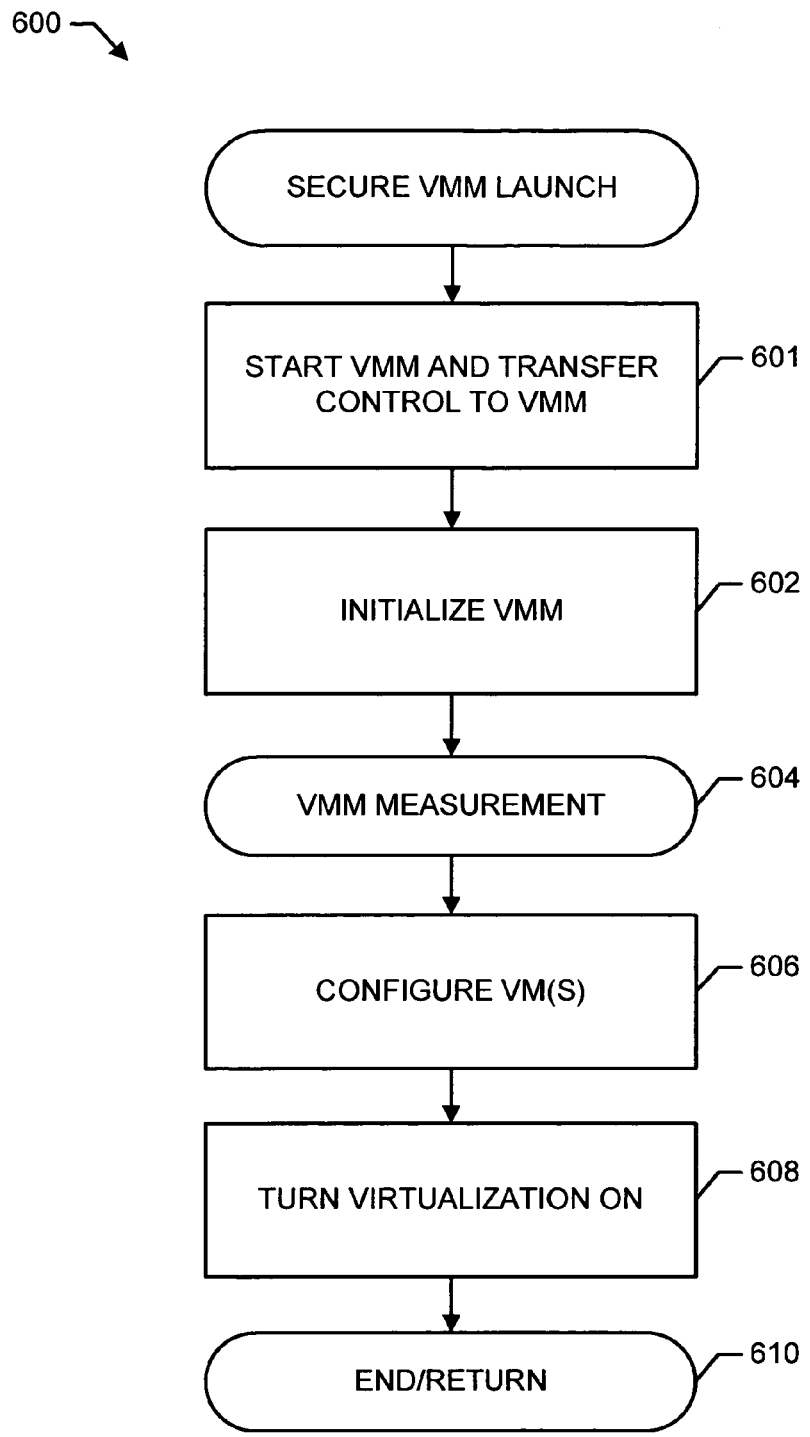
FIG. 6 is a flowchart representative of example machine accessible instructions which may be executed by a device to securely launch a virtual machine monitor shown in FIG. 3 according to an example embodiment.

An example process to securely launch the virtual machine monitor 312 of FIG. 3 (i.e., a secure virtual machine monitor launch process 600) is shown in FIG. 6. The secure virtual machine monitor launch process 600 starts the execution and measures the virtual machine monitor 312. The secure virtual machine monitor launch process 600 may be implemented as one or more instructions executed by the virtual machine monitor 312, the operating system 322, and the measurement agent 314 of the virtual machine monitor 312. The operating system 322 begins execution of the secure virtual machine monitor launch process 600 by starting the virtual machine monitor 312 and transferring control to the virtual machine monitor 312 (block 601). For example, the operating system 322 may start and transfer control to the virtual machine monitor 312 by invoking a startup function (e.g., startup_32) within the virtual machine monitor 312.

After the operating system 322 starts and transfers control to the virtual machine monitor 312 (block 601), the virtual machine monitor 312 initializes the virtual machine monitor 312 (block 602). For example, the virtual machine monitor 312 may initialize the virtual machine monitor 312 on a processor (e.g., a processor having virtualization hardware) by using well-known techniques, for example, by recording the physical address and size of a secure initialization module into a register or a memory location that is accessible to the processor.

After the virtual machine monitor 312 is initialized (block 602), the virtual machine monitor 312 invokes a virtual machine monitor measurement process (block 604). The virtual machine monitor measurement process measures the integrity of the virtual machine monitor 312 and stores the measurement in a secure hardware location (e.g., the first hardware protected location 304).

Figure 7:
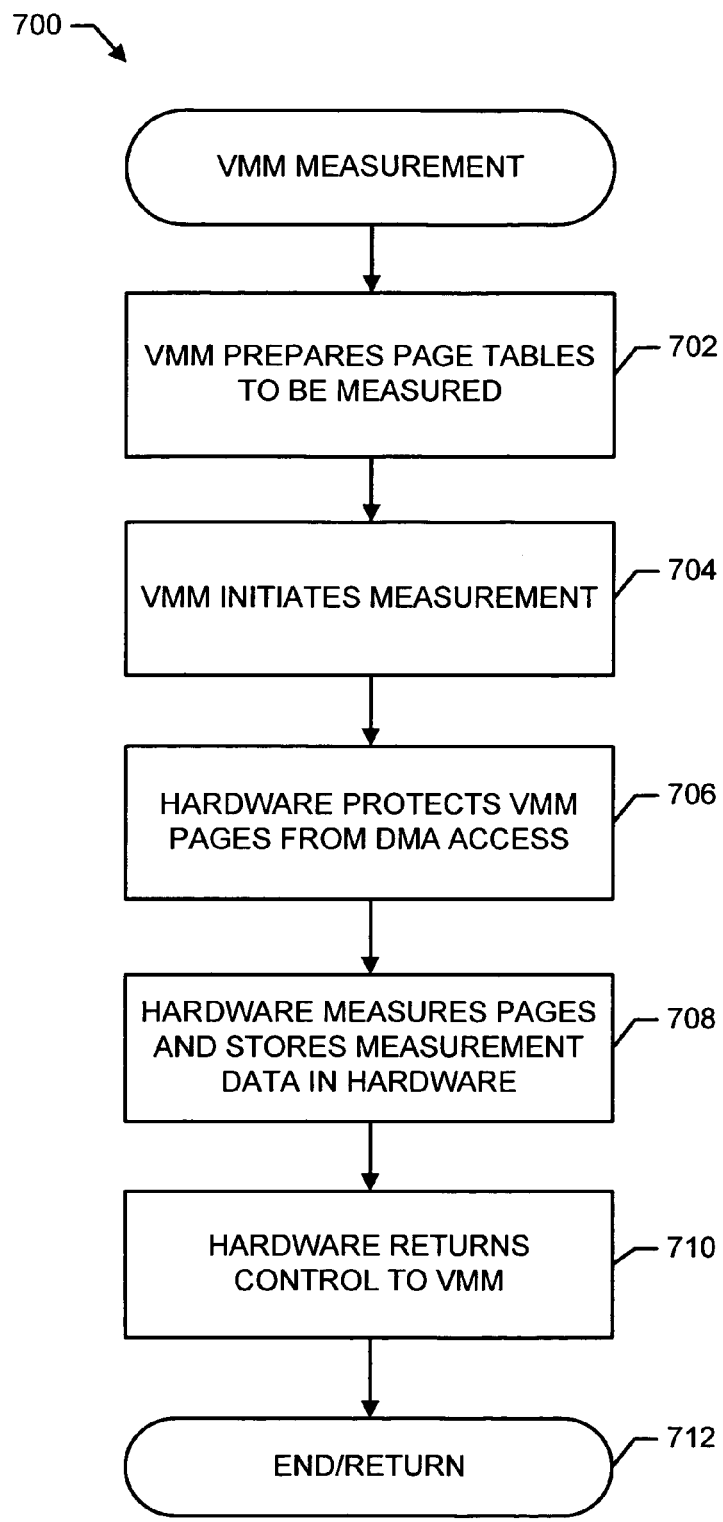
FIG. 7 is a flowchart representative of example machine accessible instructions which may be executed by a device to measure the integrity of a virtual machine monitor shown in FIG. 3 according to an example embodiment.

An example process to measure the virtual machine monitor 312 (i.e., a virtual machine monitor measurement process 700) is shown in FIG. 7. The example virtual machine monitor measurement process 700 measures the integrity of the virtual machine monitor 312 and stores measurement data in the first hardware protected location 304.

The virtual machine monitor measurement process 700 may be implemented as instructions executed by the virtual machine monitor 312 and by the hardware 302. The virtual machine monitor 312 begins execution of the virtual machine monitor measurement process 700 by preparing a plurality of pages from the virtual machine monitor 312 to be measured (block 702). Pages are well-known data structures, wherein an operating system (e.g., the operating system 322) divides the address space of a computer system (e.g., the computer system 300 of FIG. 3) into fixed size pages, which makes the address space easier to write to disk for swap space. For example, the virtual machine monitor 312 may prepare the pages to be measured by using well-known techniques, for example, by creating a paging hierarchy data structure and inserting a base address of the paging hierarchy into a variable associated with the hardware 302 and inserting a size of the paging hierarchy into a variable associated with the hardware 302.

After preparing the pages to be measured (block 702), the virtual machine monitor 312 initiates integrity measurement by the hardware 302 (block 704). For example, the virtual machine monitor 312 may be implemented on a processor (e.g., a processor having virtualization hardware) to invoke a SENTER instruction. The SENTER instruction is the entry point for hardware enabled integrity measurement and ensures execution of trusted operations. For example, in a multi-processor system the SENTER instruction ensures that all processors join a secured environment or a protected operating partition together by, for example, ensuring that all processors are ready to proceed with execution of a SINIT code, which performs various security operations such as, for example, detecting improperly configured hardware to ensure a safe and trusted operating environment, (e.g., halting some or all but one processor). While the SENTER instruction and the SINIT code are used as specific examples that may be implemented on one or more processors incorporating Intel® LaGrande Technology (LT™) (LaGrande Technology Architectural Overview, published in September 2003), comparable architectures may alternatively be used.

After the virtual machine monitor 312 initiates measurement (block 704), the hardware 302 protects the pages of the virtual machine monitor 312 from direct memory access (DMA) (block 706). For example as is discussed above, the hardware 302 may protect the pages specified by the base address and size of the page hierarchy from a direct memory access read instruction or a direct memory access write instruction from a device (e.g., the storage device 1016 of FIG. 10) to restrict a virus or a hacker on the computer system 1000 of FIG. 10 from gaining access to the pages. Direct memory access is a feature provided by some computer bus architectures that allow data to be directly written to and read from an attached device (e.g., the storage device 1016 of FIG. 10) to memory (e.g., the pages) of the computer system 1000 of FIG. 10. In addition to protecting the pages of the virtual machine monitor 312, the hardware 302 may also protect memory segments used by the hardware 302 from direct memory access.

After protecting the pages from direct memory access (block 706), the hardware 302 measures the pages and stores measurement data in the first hardware protected location 304 (block 708). For example, the hardware 302 may implement a well-known hash algorithm, such as the federal information processing standards (FIPS) secure hash algorithm (SHA) to generate the measurement data.

After measuring the pages and storing the measurement data in the first hardware protected location 304 (block 708), the hardware 302 returns control to the virtual machine monitor 312 (block 710) and the virtual machine monitor measurement process 700 ends and/or returns control to any calling routine(s) (block 712).

Returning to FIG. 6, after the virtual machine monitor measurement process returns control to the secure virtual machine monitor launch process 600 (block 604), the virtual machine monitor 312 configures the plurality of virtual machines 320 and 326 (block 606). The virtual machine monitor 312 configures the virtual machines 320 and 326 to partition the resources (e.g., memory) of the computer system 300. The virtual machine monitor 312 coordinates the usage of the resources allowing each of the plurality of the virtual machines 320 or 326 to operate as if all the resources of the computer system 300 are at the disposal of the virtual machine 320 or 326, respectively. For example, the configuration of the virtual machines 320 and 326 may be implemented on a processor (e.g., a processor having virtualization hardware) by creating a new virtual machine control structure (VMCS) and storing a state value for the operating system into the virtual machine control structure. While the virtual machine control structure is used as a specific example that may be implemented on an Intel® LaGrande Technology-enabled processor, comparable architectures may alternatively be used.

After configuring the virtual machines 320 and 326 (block 606), the virtual machine monitor 312 turns virtualization on (block 608) and the secure virtual machine monitor launch process 600 ends and/or returns control to any calling routine(s) (block 610). Turing virtualization on enables the partitioning of resources as discussed in greater detail above in conjunction with FIG. 3.

Returning to FIG. 4, after the secure virtual machine monitor launch process returns control to the boot process 400 (block 410), the boot process 400 invokes a second phase of an operating system boot process (block 412). The second phase of the operating system boot process is a method that measures and relinquishes control to the operating system 322.

Figure 8:
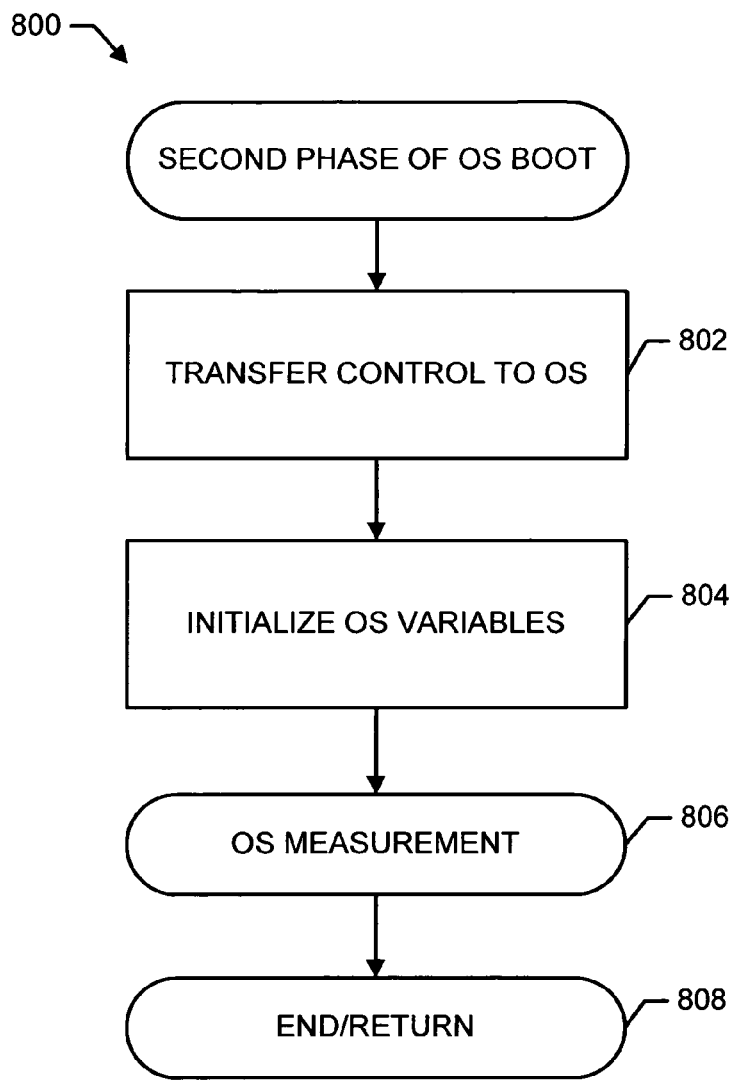
FIG. 8 is a flowchart representative of example machine accessible instructions which may be executed to boot a second phase of an operating system shown in FIG. 3 according to an example embodiment.

An example process to boot the second phase of the operating system (e.g., the operating system 322 of FIG. 3) (i.e., a second phase of the operating system boot process 800) is shown in FIG. 8. The second phase of the operating system boot process 800 transfers control from the virtual machine monitor 312 of FIG. 3 to the operating system 322 of FIG. 3 and further initializes the operating system 322 by initializing operating system variables and performing operating system measurement on the operating system 322.

The second phase of the operating system boot process 800 may be implemented as instructions executed by the operating system 322 and the virtual machine monitor 312. The virtual machine monitor 312 begins execution of the second phase of the operating system boot process 800 by transferring control to the operating system 322 (block 802) and initializing one or more operating system variables (block 804). For example, the virtual machine monitor 312 may invoke a VMLaunch function with a function parameter including the VMCS that is discussed in greater detail above in conjunction with block 606 of FIG. 6. The VMLaunch function is a well-known method of starting a virtual machine (e.g., the virtual machine 320) and may invoke, for example in the case of a Linux® operating system, a start_kernel method.

After transferring control to the operating system 322 (block 802) and initializing the operating system variables (block 804), the operating system 322 invokes an operating system measurement process (block 806). The operating system measurement process measures the integrity of the operating system 322 in a similar fashion to the measurement of the virtual machine monitor 312.

Figure 9:
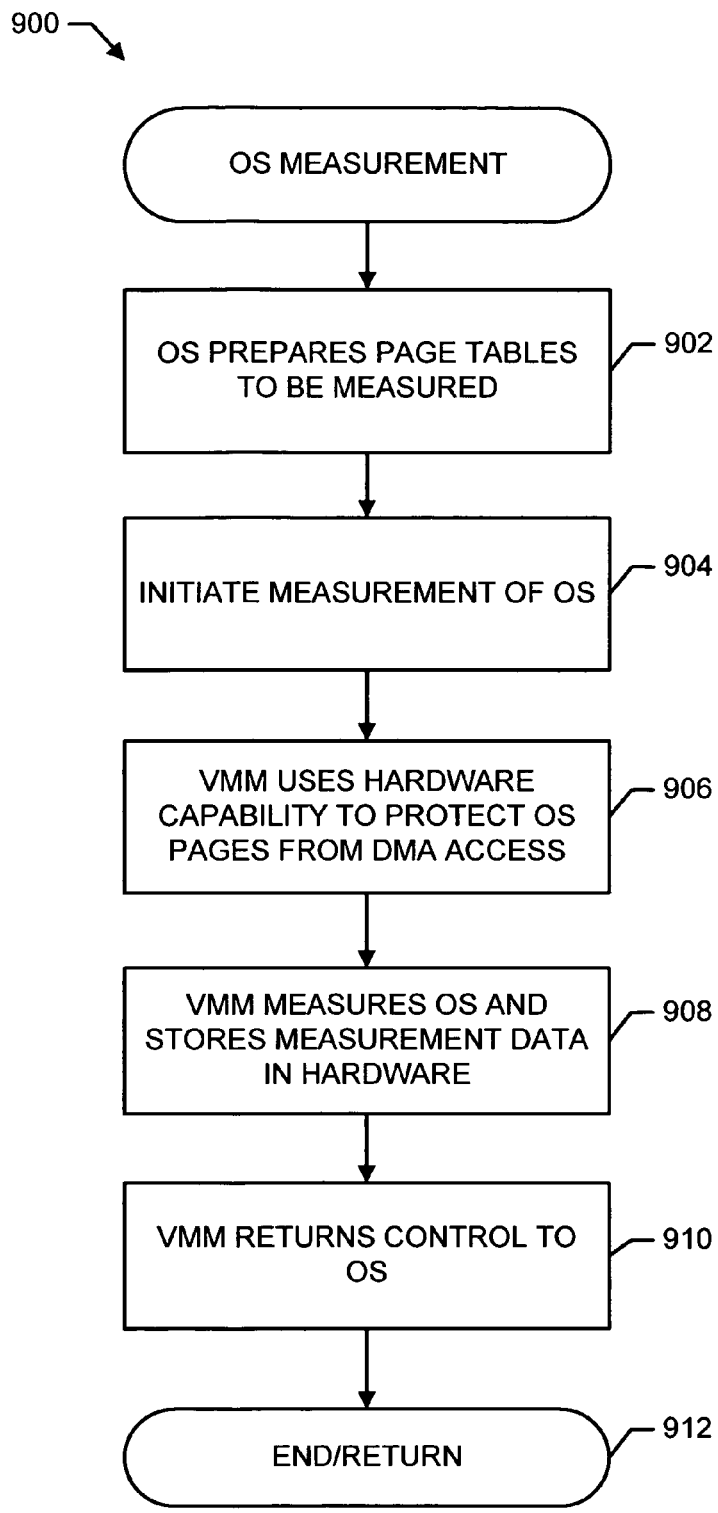
FIG. 9 is a flowchart representative of example machine accessible instructions which may be executed to measure the integrity of an operating system shown in FIG. 3 according to an example embodiment.

An example process to measure an operating system (e.g., the operating system 322 of FIG. 3) (i.e., an operating system measurement process 900) is shown in FIG. 9. The operating system measurement process 900 measures the integrity of the operating system 322 and stores the measurement data in the second hardware protected location 306 of FIG. 3.

The operating system measurement process 900 may be implemented as instructions executed by the operating system 322 and the virtual machine monitor 312. The operating system 322 begins execution of the operating system measurement process 900 by preparing page tables of the operating system 322 to be measured (block 902). For example, the operating system 322 may prepare the page tables by creating a paging hierarchy data structure and inserting a base address of the paging hierarchy into a variable that is accessible to the virtual machine monitor 312 and inserting a size of the paging hierarchy into a variable that is accessible to the virtual machine monitor 312.

After preparing the pages (block 902), the operating system 322 initiates integrity measurement (block 904). For example, the operating system 322 may invoke a start function in the virtual machine monitor 312. Upon invocation of the start function, the operating system 322 may additionally relinquish control to the virtual machine monitor 312.

After the operating system 322 initiates integrity measurement (block 904), the virtual machine monitor 312 uses the capability of the hardware 302 to protect the pages of the operating system 322 from direct memory access (block 906). For example, the virtual machine monitor 312 may invoke an instruction that is stored on the hardware 302 with the base address and size of the paging hierarchy to protect.

After protecting the pages of the operating system 322 from direct memory access (block 906), the virtual machine monitor 312 measures the pages of the operating system 322 and stores the measurement data in the second hardware protected location 306 (block 908). For example, the virtual machine monitor 312 may use a similar or identical method for measuring the pages as is described above in conjunction with block 708 of FIG. 7.

After measuring the pages and storing the measurement data in the second hardware protected location 306 (block 908), the virtual machine monitor 312 returns control to the operating system 322 (block 910) and the operating system measurement process 900 returns control to the second phase of the operating system boot process 800 (block 912). The second phase of the operating system boot process 800 then ends and returns control to block 412 of FIG. 4 (block 808).

After the second phase of the operating system boot process returns control to the boot process 400 (block 412), the boot process 400 continues operating system execution (block 414). The continuation of operating system execution is the normal operation of the operating system 322 and may include, for example, the response to request messages from the computer system A 102 of FIG. 1 as is described above in conjunction with the attestation of system integrity process 300 of FIG. 3.

FIG. 10 is a block diagram of a computer system 1000 that may implement the example apparatus and methods or processes described herein. The computer system 1000 may include a server, a personal computer, a personal digital assistant, an Internet appliance, a cellular telephone, or any other computing device. In one example, the computer system 1000 includes a main processing unit 1001 powered by a power supply 1002. The main processing unit 1001 may include a processor 1003 communicatively coupled by a system interconnect 1006 to a main memory device 1008 and to one or more interface circuits 1010. For example, the system interconnect 1006 may be an address/data bus. Of course, a person of ordinary skill in the art will readily appreciate that interconnects other than busses may be used to connect the processor 1003 to the main memory device 1008. For example, one or more dedicated lines and/or a crossbar may be used to connect the processor 1003 to the main memory device 1008.

The processor 1003 may include one or more of any type of well-known processor, such as a processor from the Intel® family of microprocessors having virtualization hardware and/or a processor having a trusted platform module (TPM), which provides the hardware protected locations 304 and 306. The virtualization hardware allows for virtualization of hardware for a computer system, which may be implemented by the virtual machine monitor 312. The trusted platform module (not shown) is processor-embedded hardware that is defined by the Trusted Computing Group (TCG) Main Specification Version 1.1b, published September 2001 by Trusted Computing Group™.

The main memory device 1008 may include dynamic random access memory (DRAM) and/or any other form of random access memory. For example, the main memory device 1008 may include double data rate random access memory (DDRAM). The main memory device 1008 may also include non-volatile memory. For example, the main memory device 1008 may store a software program which is executed by the processor 1003 in a well-known manner. The main memory device 1008 may store any suitable program capable of being executed by the processor 1003.

The interface circuit(s) 1010 may be implemented using any type of well-known interface standard, such as an Ethernet interface and/or a Universal Serial Bus (USB) interface. One or more input devices 1012 may be connected to the interface circuits 1010 for entering data and commands into the main processing unit 1001. For example, an input device 1012 may be a keyboard, mouse, touch screen, track pad, track ball, isopoint, and/or a voice recognition system.

One or more displays, printers, speakers, and/or other output devices 1014 may also be connected to the main processing unit 1001 via one or more of the interface circuits 1010. The display 1014 may be a cathode ray tube (CRT), a liquid crystal display (LCD), or any other type of display. The display 1014 may generate visual indications of data generated during operation of the main processing unit 1001. The visual indications may include prompts for human operator input, calculated values, detected data, etc.

The computer system 1000 may also include one or more storage devices 1016. For example, the computer system 1000 may include one or more hard drives, a compact disk (CD) drive, a digital versatile disk drive (DVD), and/or other computer media input/output (I/O) devices.

The computer system 1000 may also exchange data with other devices via a connection to a network 1018. The network connection may be any type of network connection, such as an Ethernet connection, a digital subscriber line, a telephone line, a coaxial cable, etc. The network 1018 may be any type of network, such as the Internet, a telephone network, a cable network, and/or a wireless network.

While the invocation of the virtual machine monitor measurement (block 604 of FIG. 6) is shown as executing prior to block 602 of FIG. 6 and subsequent to block 606 of FIG. 6, and the invocation of the operating system measurement process (block 806 of FIG. 8) is shown as executing prior to block 804 of FIG. 8 and subsequent to block 808 of FIG. 8, blocks 604 of FIGS. 6 and 806 of FIG. 8 may occur in any order in relation to the other blocks, as long as the order of block 604 of FIG. 6 executing prior to block 806 of FIG. 8 is not violated. Accordingly, it may be advantageous to execute block 604 of FIGS. 6 and 806 of FIG. 8 during the continuation of operating system execution of block 416 of FIG. 4.

The processes 200, 400, 500, 600, 700, 800, and 900 described above may be implemented using one or more software programs or sets of machine accessible instructions that are stored on a machine accessible medium (e.g., the main memory device 1008 and/or the storage devices 1016 of FIG. 10) and executed by one or more processors (e.g., the processor 1003 of FIG. 10). However, some or all of the blocks of the above listed processes may be performed manually and/or by some other device. Additionally, although the above listed processes are described with reference to the illustrated flow diagrams, persons of ordinary skill in the art will readily appreciate that many other methods of performing the above listed processes may be used instead. For example, the order of many of the blocks may be altered, the operation of one or more blocks may be changed, blocks may be combined, and/or blocks may be eliminated.

Although certain apparatus, methods, and articles of manufacture have been described herein, the scope of coverage of this patent is not limited thereto. On the contrary, this patent covers every apparatus, method and article of manufacture fairly falling within the scope of the appended claims either literally or under the doctrine of equivalents.

What is claimed is:

1. A method comprising:
    measuring a first characteristic value of a virtual machine monitor on a first computer;
    storing the first measured characteristic value in a first hardware protected location;
    transferring control of the first computer from the virtual machine monitor to an operating system;
    after transferring control from the virtual machine monitor to the operating system, receiving an invocation from the operating system at the virtual machine monitor;
    in response to receiving the invocation from the operating system at the virtual machine monitor, measuring a second characteristic value of the operating system with the virtual machine monitor;
    storing the second measured characteristic value in a second hardware protected location; and
    transmitting the first measured characteristic value and the second measured characteristic value to a second computer for integrity analysis.

2. A method as defined by claim 1, wherein measuring the first characteristic value of the virtual machine monitor comprises measuring the first characteristic value of the virtual machine monitor via a hash algorithm.

3. A method as defined by claim 1, wherein measuring the second characteristic value of the operating system comprises measuring the second characteristic value of the operating system via a hash algorithm.

4. A method as defined by claim 1, wherein the first hardware protected location is located in a first trusted platform module.

5. A method as defined by claim 4, wherein the second hardware protected location is located in a second trusted platform module.

6. A method as defined by claim 5, wherein the first trusted platform module is the second trusted platform module.

7. A method as defined by claim 1, further comprising initializing a variable in the operating system prior to measuring the second characteristic value of the operating system.

8. A method as defined by claim 1, wherein the first characteristic value of the virtual machine monitor comprises a page associated with the virtual machine monitor.

9. A method as defined by claim 8, further comprising protecting the page associated with the virtual machine monitor from at least one of a direct memory access read instruction and a direct memory access write instruction.

10. A method as defined by claim 1, wherein the second characteristic value of the operating system comprises a page associated with the operating system.

11. A method as defined by claim 10, further comprising protecting the page associated with the operating system from at least one of a direct memory access read instruction and a direct memory access write instruction.

12. An apparatus comprising:
    a first hardware protected location to store a first integrity characteristic value;
    an operating system;
    a virtual machine monitor to:
        transfer control of the first computer from the virtual machine monitor to the operating system,
        after transferring control from the virtual machine monitor to the operating system, receive an invocation from the operating system
        in response to receiving the invocation from the operating system at the virtual machine monitor, measuring a second characteristic value of the operating system, and
        transmit the first measured characteristic value and the second measured characteristic value to a computer for integrity analysis; and
    a second hardware protected location to store the second integrity characteristic value.

13. An apparatus as defined in claim 12, further comprising a processor, wherein the first and second hardware protected locations comprise protected execution memory locations in the processor.

14. An apparatus as defined in claim 12, further comprising a trusted platform module, wherein the first and second hardware protected locations comprise protected execution memory locations in the trusted platform module.

15. An apparatus as defined in claim 12, wherein hardware of the apparatus measures the first integrity characteristic value and the operating system initiates measurement of a second integrity characteristic value.

16. An apparatus as defined in claim 15, wherein the hardware comprises a processor.

17. An apparatus as defined in claim 16, wherein the first and second hardware protected locations comprise protected execution memory locations in the processor.

18. An apparatus as defined in claim 17, wherein the protected execution memory locations in the processor comprise a trusted platform module.

19. An apparatus as defined in claim 12, wherein the first integrity characteristic value is associated with the virtual machine monitor.

20. A tangible computer readable medium having instructions stored thereon that, when executed, cause a machine to:

measure a first characteristic value of a virtual machine monitor on a first computer;

store the first measured characteristic value in a first hardware protected location;

transfer control of the first computer from the virtual machine monitor to an operating system;

after transferring control from the virtual machine monitor to the operating system, receive an invocation from the operating system at the virtual machine monitor;

in response to receiving the invocation from the operating system at the virtual machine monitor, measure a second characteristic value of the operating system with the virtual machine monitor;

store the second measured characteristic value in a second hardware protected location; and transmitting the first measured characteristic value and the second measured characteristic value to a second computer for integrity analysis.

21. A tangible computer readable medium as defined in claim 20, having instructions stored thereon that, when executed, cause the machine to measure the second characteristic value of the operating system by measuring the second characteristic value of the operating system via a hash algorithm.

22. A tangible computer readable medium as defined in claim 20, having instructions stored thereon that, when executed, cause the machine to initialize a variable in the operating system prior to measuring the second characteristic value of the operating system.

* * * * *